US009542966B1

(12) United States Patent
Zheng et al.

(10) Patent No.: US 9,542,966 B1
(45) Date of Patent: Jan. 10, 2017

(54) DATA STORAGE DEVICES AND METHODS WITH FREQUENCY-SHAPED SLIDING MODE CONTROL

(71) Applicants: The Regents of the University of California, Oakland, CA (US); Western Digital Technologies, Inc., Irvine, CA (US)

(72) Inventors: Minghui Zheng, Albany, CA (US); Masayoshi Tomizuka, Berkeley, CA (US); Xu Chen, Willimantic, CT (US); Wei Xi, Mission Viejo, CA (US); Guoxiao Guo, Irvine, CA (US)

(73) Assignees: Western Digital Technologies, Inc., Irvine, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 14/828,255

(22) Filed: Aug. 17, 2015

Related U.S. Application Data

(60) Provisional application No. 62/190,457, filed on Jul. 9, 2015.

(51) Int. Cl.
*G11B 21/02* (2006.01)
*G11B 5/596* (2006.01)
*G11B 20/10* (2006.01)

(52) U.S. Cl.
CPC ..... *G11B 5/59627* (2013.01); *G11B 20/10046* (2013.01)

(58) Field of Classification Search
None
See application file for complete search history.

(56) References Cited

U.S. PATENT DOCUMENTS 5,699,207 A  12/1997  Supino et al.
5,781,365 A   7/1998  Romano et al.
5,825,582 A  10/1998  Supino et al.
(Continued)

FOREIGN PATENT DOCUMENTS

EP    0 845 140    6/1998

OTHER PUBLICATIONS

Chen, Xu, et al., "Unknown Multiple Narrow-Band Disturbance Rejection in Hard Disk Drives—An Adaptive Notch Filter and Perfect Disturbance Observer Approach," Proceedings of the ASME 2010 Dynamic Systems and Control Conference, DSCC2010, Cambridge, MA, Sep. 2010.

(Continued)

*Primary Examiner* — K. Wong
(74) *Attorney, Agent, or Firm* — Foley & Lardner LLP

(57) ABSTRACT

A data storage device includes a disk, a head, a microactuator, a coarse actuator, and a servo controller. The microactuator is configured to position the head relative to the disk. The coarse actuator is configured to position the microactuator relative to the disk. The servo controller is configured to generate an adjusted position error signal based on a position error signal and an estimated microactuator position signal. The servo controller is also configured to filter the adjusted position error signal with a shaping filter to generate a filtered position error signal, and to provide sliding mode control of the coarse actuator based at least partially on the filtered position error signal.

25 Claims, 10 Drawing Sheets

(56) References Cited

U.S. PATENT DOCUMENTS

| | | |
|---|---|---|
| 5,847,895 A | 12/1998 | Romano et al. |
| 5,852,524 A * | 12/1998 | Glover .................. G11B 5/588 360/48 |
| 5,901,010 A | 5/1999 | Glover et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,185,467 B1 | 2/2001 | Romano et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,236,895 B1 | 5/2001 | Romano et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,798,611 B1 | 9/2004 | Romano et al. |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |

(56) References Cited

U.S. PATENT DOCUMENTS

| | | |
|---|---|---|
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,283,321 B1 | 10/2007 | Sun et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,545,593 B1 | 6/2009 | Sun et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,940 B2 * | 8/2009 | Lee ................. G11B 5/596 360/77.02 |
| 7,576,941 B1 | 8/2009 | Chen et al. |
| 7,580,212 B1 | 8/2009 | Li et al. |
| 7,583,468 B2 * | 9/2009 | Sharma ............. G11B 5/596 360/77.02 |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,899,578 B2 | 3/2011 | Prisco et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |

(56) References Cited

U.S. PATENT DOCUMENTS

| | | |
|---|---|---|
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,896,955 B1 | 11/2014 | Chen et al. |
| 2007/0053258 A1 | 3/2007 | Zhou |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Chen, Xu, et al., "A Minimum Parameter Adaptive Approach for Rejecting Multiple Narrow-Band Disturbances with Application to Hard Disk Drives," IEEE Transactions on Control Systems Technology, vol. 20, No. 2, Mar. 2012, pp. 408-415.

Chen, Xu, et al., "Selective Model Inversion and Adaptive Disturbance Observer for Rejection of Time-Varying Vibrations on an Active Suspension," 2013 European Control Conference (ECC), Zurich Switzerland, Jul. 2013, pp. 2897-2903.

Gao, W., et al., "Discrete-Time Variable Structure Control Systems," IEEE Transactions on Industrial Electronics, vol. 42, No. 2, Apr. 1995, pp. 117-122.

Hu, Q., et al., "Discrete-Time Sliding Mode Control With Time-Varying Surface for Hard Disk Drives," IEEE Transactions on Control Systems Technology, vol. 17, No. 1, Jan. 2009, pp. 175-183.

Koshkouei, A.J., et al., "Robust Frequency Shaping Sliding Mode Control," IEE Proc.—Control Theory Appl., vol. 147, No. 3, May 2000, pp. 312-320.

Lee, S.H., et al., "Design of a Dual-Stage Actuator Control System with Discrete-Time Sliding Mode for Hard Disk Drives," Proceedings of the 39th IEEE Conference on Decision and Control, Sydney, Australia, Dec. 2000, pp. 3120-3125.

Mehta, A., et al., "Frequency-Shaped Sliding Mode Control Using Output Sampled Measurements," IEEE Transactions on Industrial Electronics, vol. 56, No. 1. Jan. 2009, pp. 28-35.

Moura, J., et al., "Frequency-Shaped Sliding Modes: Analysis and Experiments," IEEE Transactions on Control Systems Technology, vol. 5, No. 4, Jul. 1997, pp. 394-401.

Nonami, K., et al., "Frequency-Shaped Sliding Mode Control Using H∞ Control and μ Synthesis Theory," IEEE Workshop on Variable Structure Systems, 1996, pp. 175-180.

Wu, W.C., et al., "Frequency-Shaped Sliding Mode Control for Flying Height of Pickup Head in Near-Field Optical Disk Drives," IEEE Transactions on Magnetics, vol. 41, No. 2, Feb. 2005, pp. 1061-1063.

Yanada, H., et al., "Frequency-Shaped Sliding Mode Control of an Electrohydraulic Servo-Motor," Proc. Instn. Mech. Engrs., vol. 213, Part 1, 1999, pp. 441-448.

Young, K.D., et al., "Frequency Shaping Compensator Design for Sliding Mode," Int. J. Control, vol. 57, No. 5, 1993, pp. 1005-1019.

Zhang, D.Q., et al., "Discrete-Time Sliding Mode Proximate Time Optimal Seek Control of Hard Disk Drives," IEE Proc.—Control Theory Appl., vol. 147, No. 4, Jul. 2000, pp. 440-446.

Zhou, J., et al., "Improved Proximate Time-Optimal Sliding-Mode Control of Hard Disk Drives," IEE Proc.—Control Theory Appl., vol. 148, No. 6, Nov. 2001, pp. 516-522.

Lee, S.H. and Chung, C.C., "Optimal Sliding Mode Dual-Stage Actuator Control for Magnetic Disk Drives," Proceedings of the 43rd IEEE Conference on Decision and Control, vol. 4, 2004, pp. 4075-4080.

Lee, S.H., Baek, S.E., and Kim Y.H., "Design of a Dual-Stage Actuator Control System with Discrete-Time Sliding Mode for Hard Disk Drives," Proceedings of the 39th IEEE Conference on Decision and Control, vol. 4, 2000, pp. 3120-3125.

Wu, W.C. and Liu, T., "Frequency-shaped Sliding Mode Control for Flying Height of Pickup Head in Near-field Optical Disk Drives," IEEE Transactions on Magnetics, vol. 41, No. 2, 2005, pp. 1061-1063.

\* cited by examiner $$e_w(k+1) = A_w e_w(k) + B_w e_{vcm}(k)$$

$$e_{vcm,f}(k) = Q_f\{e_{vcm}(k)\} = C_w e_w(k) + D_w e_{vcm}(k)$$

Where:

$$e_w(0) = \begin{bmatrix} 0 \\ 0 \end{bmatrix}$$

$A_w$, $B_w$, $C_w$, $D_w$ are matrices with compatible dimensions (for example, if the shaping filter is a second-order peak filter, then $A_w$ is a 2 by 2 matrix, $B_w$ is a 2 by 1 vector, $C_w$ is a 1 by 2 vector, and $D_w$ is a 1 by 1 scaler.)

FIG. 3B

$$e_{vcm,d}(k) = \frac{e_{vcm}(k) - e_{vcm}(k-1)}{T}$$

Where:

$T$ = Sampling Time

FIG. 3C

$$s(k) = H \begin{bmatrix} e_{vcm,f}(k) \\ e_{vcm,d}(k) \end{bmatrix} = e_{vcm,f}(k) + h_2 e_{vcm,d}(k)$$

Where:

$H = \begin{bmatrix} 1 & h_2 \end{bmatrix}$ $h_2$ is a Scalar Value

FIG. 3D

$$u_{vcm}(k) = (\tilde{H}\tilde{B})^{-1}[(1-qT)s(k) - \tilde{H}\tilde{A}\tilde{E}(k) - (\varepsilon T + \beta)sgn(s(k))]$$

Where: $\tilde{H} = [C_w \ D_w \ h_2]$ $\tilde{B} = \begin{bmatrix} 0 \\ B_1 \\ B_2 \end{bmatrix}$ $q > 0$ $1 - qT > 0$ $\tilde{A} = \begin{bmatrix} A_w & B_w & 0 \\ 0 & A_{11} & A_{12} \\ 0 & A_{21} & A_{22} \end{bmatrix}$ $e(k) = \begin{bmatrix} e_{vcm,f}(k) \\ e_{vcm,d}(k) \end{bmatrix}$ $\tilde{E}(k) = (e_w^T(k), e^T(k))^T$ $0 \lessapprox \varepsilon < 1$ $\beta = \tilde{H}\tilde{B}D + \tilde{H}\tilde{B}_a V_a$ $A_{11}, A_{12}, A_{21}, A_{22}, B_1, B_2, D, V_a$ are Scalar Values

FIG. 3E

DATA STORAGE DEVICES AND METHODS WITH FREQUENCY-SHAPED SLIDING MODE CONTROL

CROSS-REFERENCE TO RELATED PATENT APPLICATIONS

This application claims priority from U.S. Provisional Patent App. Ser. No. 62/190,457, filed Jul. 9, 2015, the entire contents of which are incorporated by reference herein.

FIELD

Some embodiments of the present invention relate generally to data storage devices such as disk drives and methods and, in specific embodiments, to a data storage device including a coarse actuator, a microactuator, and a servo controller for positioning a head over a disk.

BACKGROUND

Data storage devices such as disk drives are commonly used in computers and other electronic devices for the storage and retrieval of data. Disk drives generally include a disk, a head connected to an actuator arm, and an actuator that controls the actuator arm to position the head over the disk. The actuator is usually controlled by a servomechanism that performs the operations of track seek to move the head from one track to another over the disk, and track following to attempt to keep the head over the center of a track during data reads and writes. If the head moves too far from the center of a track during a read operation, the operation must be suspended and retried, which reduces the data transfer rate of the disk drive. If the head moves too far from the center of a track during a write operation, data integrity may be adversely affected due to existing data on a wrong track being improperly overwritten and potentially lost.

When operating in various environments, a disk drive may be subject to disturbances that affect the head positioning by the servomechanism. For example, the environment may cause vibrations in the disk drive and there may also be external shocks that act upon the disk drive. Such vibrations and shocks may cause the actuator arm on which the head is located to oscillate and, thus, to move farther distances away from a track center. As disk drives become smaller and use lighter actuator arms, the problems caused by external disturbances become a larger concern.

SUMMARY OF THE DISCLOSURE

Data storage devices and methods in accordance with various embodiments provide for frequency-shaped sliding mode control to enhance servo controller performance. Although for the sake of illustration disk drives will be shown in the disclosure, a data storage device may include a disk drive, portions of a disk drive combined with non-disk drive components, multiple disk drives, etc. The frequency-shaped sliding mode control can be used for vibration rejection in the data storage devices to make the data storage devices more robust in the presence of external disturbances such as audio vibrations and sudden shock. In some embodiments, the frequency shaping is performed using a peak filter that receives a position error signal relating to a position of a head with respect to a track, and that amplifies the position error signal at customized frequencies. The resulting signal from the frequency shaping is then provided in various embodiments as at least part of an input for sliding mode control in which a control law for the sliding mode control is used to generate a control signal to pull the head to a desired trajectory.

A data storage device in accordance with an embodiment includes a disk, a head, a microactuator, a coarse actuator, and a servo controller. The microactuator is configured to position the head relative to the disk. The coarse actuator is configured to position the microactuator and the head relative to the disk. The servo controller is configured to generate an adjusted position error signal based on a position error signal and an estimated microactuator position signal. The servo controller is also configured to filter the adjusted position error signal with a shaping filter to generate a filtered position error signal, and to provide sliding mode control of the coarse actuator based at least partially on the filtered position error signal.

In some embodiments, the coarse actuator comprises a voice coil motor, and the microactuator comprises a piezoelectric actuator. In various embodiments, the position error signal represents a position of the head relative to a center of a track of the disk, and the servo controller is further configured to generate a microactuator compensation signal to control the microactuator based on the position error signal. Also, in various embodiments, the servo controller is further configured to generate the estimated microactuator position signal with a microactuator position estimator that estimates a response of the microactuator to the microactuator compensation signal.

In some embodiments, the servo controller is further configured to generate a derivative position error signal as a derivative of the adjusted position error signal, and is configured to provide the sliding mode control of the coarse actuator based on the filtered position error signal and the derivative position error signal. Also, in some embodiments, the servo controller is further configured to scale the derivative position error signal to generate a scaled derivative position error signal, and is configured to provide the sliding mode control of the coarse actuator based on the filtered position error signal and the scaled derivative position error signal.

In various embodiments, the servo controller comprises a digital signal processor that is programmed with a discrete time state space model of the shaping filter and that is programmed with a control law for the sliding mode control. In some embodiments, the shaping filter is a peak filter with a single peak. In some embodiments, the shaping filter is a peak filter with multiple peaks. In various embodiments, the shaping filter is a peak filter that is configured to amplify a magnitude of the adjusted position error signal when a frequency of the adjusted position error signal is approximately a peak frequency of the peak filter in a closed-loop control system. Also, in various embodiments, the peak frequency of the peak filter is an expected frequency of the position error signal due to vibration of an actuator arm assembly on which the head is mounted induced by audio sounds.

In some embodiments, the servo controller is further configured such that the sliding mode control provided by the servo controller comprises a nonlinear control of the coarse actuator with respect to the filtered position error signal. Also, in some embodiments, the servo controller is further configured such that the sliding mode control comprises a discrete time nonlinear control that includes an approaching phase in which a trajectory of the sliding mode control is toward a sliding surface, and also includes a sliding phase in which the trajectory of the sliding mode control is to slide along the sliding surface, and the sliding mode control has a different gain when the trajectory is approaching from one side of the sliding surface than when the trajectory is approaching from an opposite side of the sliding surface.

A method for providing control in a data storage device in accordance with various embodiments includes generating an adjusted position error signal based on a position error signal and an estimated microactuator position signal, filtering the adjusted position error signal with a shaping filter, such as a peak filter, to generate a filtered position error signal, and providing sliding mode control of a coarse actuator based at least partially on the filtered position error signal. In various embodiments, the method further includes generating a microactuator compensation signal to control a microactuator based on the position error signal, and generating the estimated microactuator position signal with a microactuator position estimator that estimates a response of the microactuator to the microactuator compensation signal, where the position error signal represents a position of a head moved by the coarse actuator and the microactuator relative to a center of a track of a disk.

In various embodiments, the method further includes generating a derivative position error signal as a derivative of the adjusted position error signal, and the providing of the sliding mode control includes providing the sliding mode control based on the filtered position error signal and the derivative position error signal. Also, in various embodiments, the method further includes scaling the derivative position error signal to generate a scaled derivative position error signal, and the providing of the sliding mode control includes providing the sliding mode control based on the filtered position error signal and the scaled derivative position error signal.

In some embodiments, the shaping filter is a peak filter with a single peak. In some embodiments, the shaping filter is a peak filter with multiple peaks. Also, in some embodiments, the shaping filter is a peak filter and the method further includes processing a particular position error signal obtained while an actuator arm assembly on which a head is mounted to is vibrating due to external audio sound with an adaptive notch filter with adjustable notch frequencies to determine at least one frequency range at which the particular position error signal has a maximum value, and setting a peak frequency of the peak filter based on the at least one frequency range.

Thus, in various embodiments a discrete-time frequency-shaped sliding mode control is provided for vibration rejection, such as audio vibration rejection, in data storage devices. Various embodiments include a servo controller that provides for frequency-shaped sliding mode control where the frequency-shaped sliding surface design is based on peak filters, which allows for providing frequency dependent control allocation in sliding mode control. The frequency-shaped sliding mode control in various embodiments provides for additional design flexibilities in the frequency domain, and allows for improving vibration rejection during track following in the data storage devices.

BRIEF DESCRIPTION OF THE DRAWINGS

FIG. 3B illustrates a state space representation for a shaping filter in accordance with an embodiment;

FIG. 3C illustrates an example equation for a derivative unit in accordance with an embodiment;

FIG. 3D illustrates an example equation for a scaling unit in accordance with an embodiment;

FIG. 3E illustrates a control law for a sliding mode control unit in accordance with an embodiment;

DETAILED DESCRIPTION

Figure 1:
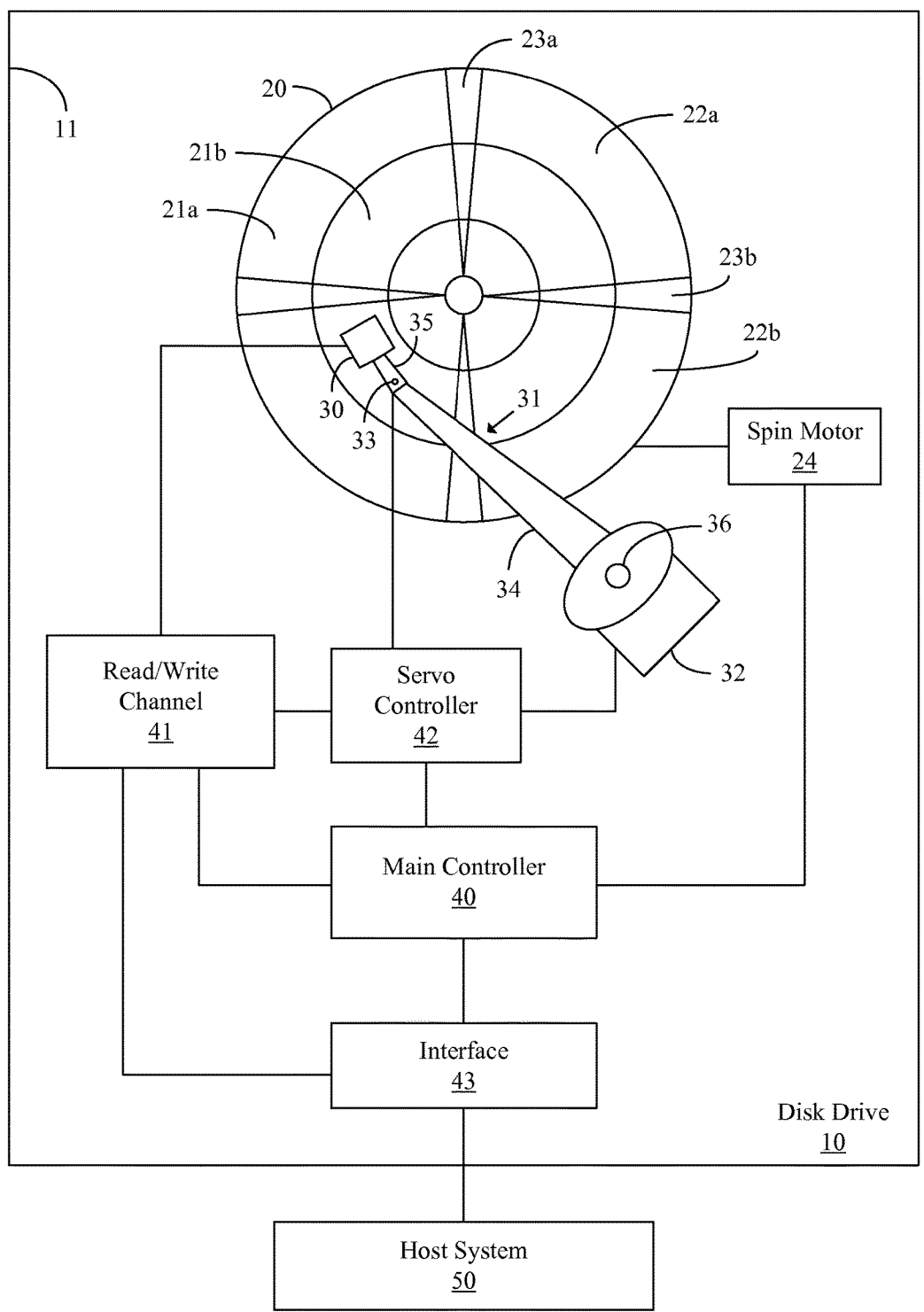
FIG. 1 illustrates a functional block diagram of a data storage device in an exemplary form of a disk drive of an embodiment in communication with a host system.

FIG. 1 illustrates a functional block diagram of a data storage device in an exemplary form of a disk drive 10 of an embodiment of the present invention in communication with a host system 50. The disk drive 10 includes a casing 11, a disk 20, a spin motor 24, a transducer or head 30, an actuator arm assembly 31, a coarse actuator 32, a microactuator 33, a main controller 40, a read/write (r/w) channel 41, a servo controller 42, and an interface 43. The head 30 is mounted on one end of the actuator arm assembly 31, and another end of the actuator arm assembly 31 is connected to a surface (not shown) of the casing 11 of the disk drive 10 by a bearing 36.

The actuator arm assembly 31 includes a first member 34 and a second member 35 that are interconnected by the microactuator 33. During operation, the spin motor 24 spins the disk 20 around a central axis, and the head 30 reads data from or writes data to a surface of the disk 20. The coarse actuator 32 is configured to rotate the actuator arm assembly 31 about the bearing 36 in order to control a position of the microactuator 33 and the head 30 over the disk 20. The microactuator 33 is configured to move the second member 35 of the actuator arm assembly 31 to position the head 30 over the disk 20.

The disk drive 10 is not limited to having only a single disk 20, but may have a plurality of disks. Also, in some embodiments, data may be written to both a top surface and a bottom surface of each disk, in which case a different head is required for each surface. In various embodiments, the disk 20 is made of aluminum, glass, or other suitable substance, and is coated on one or both sides with one or more layers of magnetic material to allow for magnetic recording of data. In some embodiments, the casing 11 is a rigid structure that surrounds the disk 20 and other components of the disk drive 10 to keep the disk 20 and other components protected.

The head 30 may have a single element for performing both reading and writing, or the head 30 may have separate elements for performing each of those operations, in which case the head 30 would comprise a read element and a write element. The head 30 may utilize any of various types of read sensor technologies, such as anisotropic magnetoresistive (AMR), giant magnetoresistive (GMR), tunneling magnetoresistive (TuMR), or the like. In some embodiments, the head 30 is used for reading data from the disk 20 and another head (not shown) is provided on the actuator arm assembly 31 for writing data to the disk 20.

In various embodiments, the coarse actuator 32 is configured to position the microactuator 33 and the head 30 relative to the disk 20 by moving the actuator arm assembly 31. In some embodiments, the coarse actuator 32 includes a motor, such as a voice coil motor (VCM), or the like, that provides for coarse positioning of the head 30 over the disk 20. For example, in some embodiments, the coarse actuator 32 includes a motor, such as a voice coil motor with a coil suspended in a magnetic field produced by permanent magnets, and when a current is passed through the coil of the voice coil motor a torque is generated to move the actuator arm assembly 31. In various embodiments, a torque generated by the coarse actuator 32 is controlled by changing an amplitude and/or polarity of a current provided as an input to the coarse actuator 32.

In various embodiments, the microactuator 33 includes, for example, a piezoelectric actuator, an electromagnetic actuator, an electrostatic actuator, or the like. The microactuator 33 is configured to provide for fine positioning of the head 30 over the disk 20. In some embodiments, a range of movement of the microactuator 33 may be small, such as moving the head 30 across a few tracks of the disk 20, while a range of movement of the coarse actuator 32 may be large, such as moving the head 30 across all tracks on the disk 20. In some embodiments, the microactuator 33 includes a piezoelectric material that undergoes dimensional change, such as expansion or contraction, when a voltage is applied to the material, and the microactuator 33 is positioned such that the expansion and/or contraction of the piezoelectric material causes the second member 35 of the actuator arm assembly 31 to move. In some such embodiments, the piezoelectric material may be, for example, quartz, tourmaline, potassium sodium tartrate, lead zirconate titanate, or any other suitable material. The use of two actuators (i.e., the coarse actuator 32 and the microactuator 33) for positioning the head 30 is a dual-stage actuator design.

In the following discussion, the disk drive 10 is described with reference to functional blocks. The functions may be implemented using one or more of hardware, software, and firmware. In addition, more than one function, or different parts of functions, may be combined in a given hardware, software, or firmware implementation. For example, in various embodiments, the servo controller 42 is implemented using a digital signal processor (DSP), an integrated circuit (IC), a field-programmable gate array (FPGA), or the like.

When the disk drive 10 is connected to a host system 50, such as for use in a computer or other electronic equipment, the interface 43 communicates with the host system 50 to receive, for example, data and commands, and to send, for example, data and status identifiers. The interface 43 also communicates with the main controller 40 and the r/w channel 41 to send and receive, for example, data and commands. In various embodiments, the main controller 40 is configured such that when the main controller 40 receives a command from the interface 43 for a read or a write operation, the main controller 40 provides a signal to the spin motor 24 to cause the disk 20 to spin.

The disk 20 has a plurality of tracks 21a, 21b for storing data. While only a few tracks are shown in FIG. 1 for the convenience of illustration, it should be understood that in various embodiments there are thousands of tracks on the disk 20. Each of the tracks 21a, 21b has a plurality of data sectors, such as the data sectors 22a, 22b of the track 21a, and also has a plurality of embedded servo sectors, such as the embedded servo sectors 23a, 23b of the track 21a. While only a few data sectors and embedded servo sectors are shown for each of the tracks in FIG. 1 for the convenience of illustration, it should be understood that in various embodiments there are hundreds of data sectors and embedded servo sectors for each track. During operation of the disk drive 10, a data block may be read from or written to a data sector, such as the data sectors 22a, 22b. The plurality of embedded servo sectors, such as the embedded servo sectors 23a, 23b are written with servo patterns or data that are used for determining a position of the head 30 with respect to a track of the plurality of tracks on the disk 20.

In various embodiments, the main controller 40 is configured such that when a read or a write operation is to be performed, the main controller 40 sends a signal that contains information about a selected track to the servo controller 42. In various embodiments, the servo controller 42 is configured to then perform a seek operation to position the head 30 over the selected track by controlling the coarse actuator 32 and the microactuator 30. During the seek operation, the head 30 reads servo patterns from the embedded servo sectors of the disk 20, and the signal from the head is processed by the r/w channel 41 and provided to the servo controller 42. In various embodiments, the servo controller 42 is configured to use the signal from the reading of the servo patterns to determine when the head 30 is on-track, and the servo controller 42 is configured to send a signal to the r/w channel 41 to allow for the start of a read or a write operation when the head 30 is on-track. In various embodiments, the r/w channel 41 also receives a command from the main controller 40 that specifies the type of operation to be performed. In the case of a read operation, the r/w channel 41 causes the head 30 to read the data and then the data is sent to the interface 43 to be provided to the host system 50. In the case of a write operation, the r/w channel 41 receives data obtained by the interface 43 from the host system 50 and causes the head 30 to write the data. In some embodiments, one or more of the r/w channel 41, the main controller 40 and the servo controller 42 may be integrated into a single component.

Figure 2:
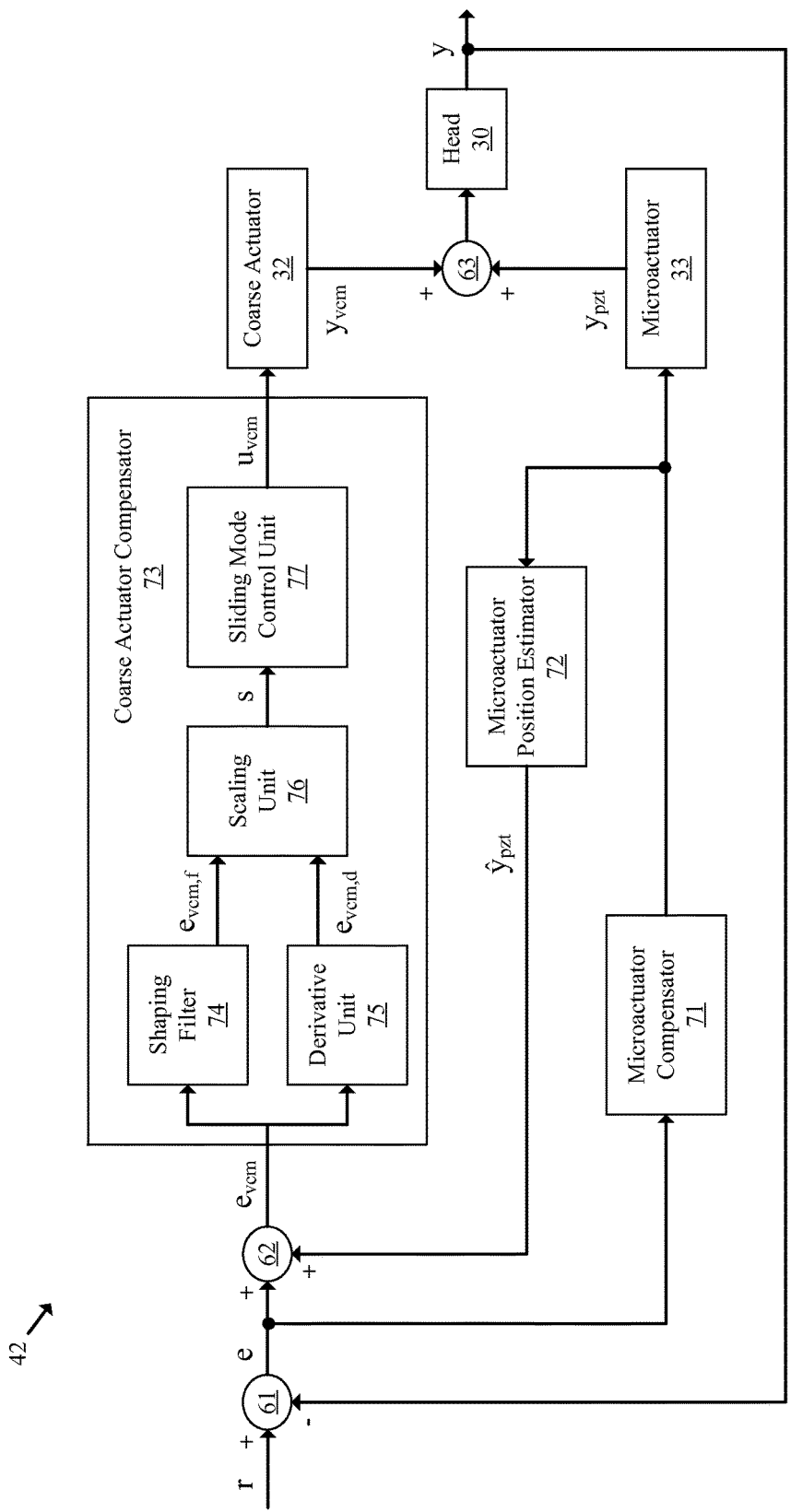
FIG. 2 illustrates a block diagram of a servo controller in communication with a coarse actuator and a microactuator that control the position of a head in accordance with an embodiment.

FIG. 2 illustrates a block diagram of the servo controller 42 in communication with the coarse actuator 32 and the microactuator 33 that control the position of the head 30 in accordance with an embodiment. In the following discussion, the servo controller 42 is described with reference to functional blocks. The functions of the functional blocks may be implemented using one or more of hardware, software, and firmware. More than one function, or different parts of functions, may be combined in a given hardware, software, or firmware implementation. In various embodiments, the servo controller 42 is implemented using a digital signal processor (DSP), an integrated circuit (IC), a field-programmable gate array (FPGA), or the like, that is configured to perform the functions.

The servo controller 42 includes a microactuator compensator 71, a microactuator position estimator 72, and a coarse actuator compensator 73. The coarse actuator compensator 73 includes a shaping filter 74, a derivative unit 75, a scaling unit 76, and a sliding mode control unit 77. The servo controller 42 is configured such that during a track following operation the servo controller 42 obtains a reference signal that is denoted by "r" in FIG. 2. In some embodiments, the servo controller 42 obtains the reference signal by performing one or more lookups in one or more tables stored by the servo controller 42 based on the track that is desired to be read from or written to during the track following operation. In some embodiments, the servo controller 42 is configured to calculate the reference signal based on values obtained from one or more tables stored by the servo controller 42. With reference to FIGS. 1 and 2, in various embodiments the reference signal indicates a desired position of the head 30 over the disk 20.

During a track following operation, the head 30 reads data from servo sectors on the disk 20, and the head 30 provides a signal based on the read data to the r/w channel 41. The r/w channel 41 processes the signal from the head 30 when the head 30 reads data from the servo sectors, and the r/w channel 41 provides servo information to the servo controller 42 by processing the signal from the head 30. The servo controller 42 uses the servo information as a sensed position signal (denoted by "y" in FIG. 2) that indicates an actual position of the head 30 over the disk 20. In the servo controller 42, the sensed position signal is used as feedback. In various embodiments, the servo controller 42 includes a first summing node 61 that is configured to subtract the sensed position signal "y" from the reference signal "r" in order to provide a position error signal (PES) that is denoted by "e" in FIG. 2. With reference to FIGS. 1 and 2, in various embodiments, the position error signal indicates a difference between a desired position of the head 30 specified by the reference signal and an actual position of the head 30 specified by the sensed position signal. In various embodiments, the servo controller 42 is configured to determine the PES from the servo information, and the PES is a signal that is indicative of a position of the head 30 relative to a center of a selected track. In various embodiments, the PES is specified in terms of a percentage (+/−) that the head 30 is away from the center of the selected track of the disk 20.

The PES is available at discrete points in time when the head 30 is reading servo information from embedded servo sectors on the disk 20. The sampling time for the reading of the servo information depends on the number of embedded servo sectors per track and the rotational speed of the disk 20. Thus, in various embodiments, the PES is specified by sample points obtained at the various sampling times when the head 30 is reading servo information from the embedded servo sectors of the disk 20. In various embodiments, each of the embedded servo sectors includes a servo pattern, such as a PES burst pattern field, or the like, created at the time of manufacturing of the disk drive 10, and a readback waveform generated by the head 30 when scanning the servo pattern is decoded to measure sample points of the PES.

The microactuator compensator 71 receives the position error signal that is provided by the first summing node 61. The microactuator compensator 71 is configured to provide a microactuator compensation signal based on the position error signal that is used to control the microactuator 33 to compensate for the position error. The microactuator position estimator 72 receives the microactuator compensation signal that is provided by the microactuator compensator 71. The microactuator position estimator 72 is configured to estimate a response of the microactuator 33 to the microactuator compensation signal, and is configured to provide an estimated microactuator position signal (denoted by "$\hat{y}_{pzt}$" in FIG. 2) that estimates a movement of the head 30 by the microactuator 33 in response to the microactuator compensation signal. The servo controller 42 includes a second summing node 62 that adds the position error signal to the estimated microactuator position signal to provide an adjusted position error signal (denoted by "$e_{vcm}$" in FIG. 2) that takes into account an estimate of a response of the microactuator 33 to the position error signal.

The coarse actuator compensator 73 receives the adjusted position error signal that is provided by the second summing node 62. The coarse actuator compensator 73 is configured to provide a coarse actuator control signal (denoted by "$u_{vcm}$" in FIG. 2) based on the adjusted position error signal that can be used to control the coarse actuator 32 to compensate for the position error and for the movement of the microactuator 33 in response to the position error. The coarse actuator 32 is configured to move the head 30 in accordance with the coarse actuator control signal. The microactuator 33 is configured to move the head 30 in accordance with the microactuator compensation signal. The third summing node 63 illustrates that the position of the head 30 is a combination of the position of the head 30 due to the movement of the coarse actuator 32 (denoted by "$y_{vcm}$" in FIG. 2) and the position of the head 30 due to the movement of the microactuator 33 (denoted by "$y_{pzt}$" in FIG. 2).

The servo controller 42 includes the coarse actuator compensator 73, and the coarse actuator compensator 73 includes the shaping filter 74, the derivative unit 75, the scaling unit 76, and the sliding mode control unit 77. The shaping filter 74 is configured to filter the adjusted position error signal to generate a filtered position error signal (denoted by "$e_{vcm,f}$" in FIG. 2). In various embodiments, the servo controller 42 is implemented using, for example, a digital signal processor, and is programmed with a discrete time state space model of the shaping filter 74 to perform the filtering operation. In some embodiments, the shaping filter 74 is a peak filter with a single peak. In some embodiments, the shaping filter 74 is a peak filter with multiple peaks. In various embodiments, the shaping filter 74 is a peak filter and is configured to amplify a magnitude of the adjusted position error signal when a frequency of the adjusted position error signal is approximately a peak frequency of the peak filter. Also, in various embodiments, the shaping filter 74 is a peak filter and the peak frequency of the peak filter is an expected frequency of the position error signal due to vibration of the actuator arm assembly 31 on which the head 30 is mounted induced by audio sounds.

The derivative unit 75 is configured to generate a derivative position error signal (denoted by "$e_{vcm,d}$" in FIG. 2) that represents a derivative of the adjusted position error signal. The scaling unit 76 is configured to scale the derivative position error signal to obtain a scaled derivative position error signal, and is configured to provide a sliding mode signal (denoted by "s") for the sliding mode control unit 77 based on the filtered position error signal and the derivative position error signal. In various embodiments, a sliding surface of the sliding mode control is specified as a goal for a position of the head 30 where the sliding mode signal goes to zero through control of the position of the head 30.

The sliding mode control unit 77 is configured to provide sliding mode control of the coarse actuator 32 based on the sliding mode signal. The sliding mode signal is generated by the scaling unit 76 based at least partially on the filtered position error signal, so the sliding mode control of the coarse actuator 32 is based at least partially on the filtered position error signal. In various embodiments, the servo controller 42 is implemented by, for example, a digital signal processor, or the like, and the functions of the sliding mode control unit 77 are implemented by program instructions of a control law for the sliding mode control.

In some embodiments, the servo controller 42 is configured such that the sliding mode control provided by the sliding mode control unit 77 of the servo controller 42 is a nonlinear control of the coarse actuator 32 with respect to the filtered position error signal. Also, in some embodiments, the sliding mode control unit 77 is configured such that the sliding mode control is a discrete time nonlinear control that includes an approaching phase in which a trajectory of the sliding mode control is toward the sliding surface, and also includes a sliding phase in which the trajectory of the sliding mode control is to slide along the sliding surface, and where the sliding mode control has a different gain when the trajectory is approaching from one side of the sliding surface than when the trajectory is approaching from an opposite side of the sliding surface.

With reference to FIGS. 1 and 2, various embodiments of the disk drive 10 provide for adaptive audio vibration rejection. When disk drives are used in multimedia environments, vibrations of actuator arm assemblies of the disk drives caused by sounds from speakers are becoming a significant source of position error for heads over tracks. As a head moves back and forth over a track center due to vibrations of an actuator arm assembly on which the head is located, the position error signal for the head goes up and down at frequencies based at least partially on the vibrations. The audio vibrations from, for example, computer and/or television speakers, contaminate disk drive servo performance by introducing peaks to the PES spectrum. Various embodiments of the disk drive 10 provide for a feedback control algorithm for audio-vibration compensation.

Various embodiments of the disk drive 10 provide for discrete-time frequency-shaped sliding mode control for vibration rejection, such as for audio vibration rejection. In various embodiments, a discrete-time frequency-shaped sliding mode control (FSSMC) is provided for vibration rejection in the disk drive 10. Some vibrations can cause significant degradation of servo performance in related hard disk drives and have become a major concern in the disk drive industry. The FSSMC of various embodiments of the disk drive 10 involves a frequency-shaped sliding surface design based on a peak filter and provides frequency dependent control allocation in sliding mode control (SMC). The FSSMC of various embodiments provides for design flexibilities in the frequency domain, and can improve vibration rejection during track-following in the disk drive 10.

In hard disk drives, increasing data track density requires a reduction in the position error signal (PES) and improved servo performance. High-frequency vibrations, such as from audio vibrations, or the like, may excite system resonances and have become one of the most important vibrations to deal with. Such audio vibrations may be induced in the disk drives by audio sounds, such as when disk drives are equipped in modern multimedia personal computers with audio speakers. Various embodiments of the disk drive 10 have customized control allocation for attenuating large spectral peaks in audio vibrations, and the FSSMC of various embodiments increases the local gain of sliding mode control at the frequencies where the servo performance would otherwise be degraded by audio vibrations. In various embodiments, a peak filter is utilized for performance improvement of audio-vibration rejection. Various embodiments include a second-order peak filter for the shaping filter 74 where the filter poles and zeros are stable, such that the sliding surface and the full closed-loop system are stable. Some embodiments include a higher-order filter for the shaping filter 74. Various embodiments allow for a control algorithm and filter design to be defined in discrete-time, such that they are directly implementable on the disk drive 10.

Various embodiments of a control algorithm disclosed herein include frequency-shaped sliding mode control for vibration rejection and are usable in both single-stage actuator hard disk drives and dual-stage actuator hard disk drives. In various embodiments, the coarse actuator 32 is a voice coil motor (VCM) and the microactuator 33 is a piezoelectric actuator (PZT), and the servo controller 42 includes a control loop for the VCM and a control loop for the PZT. In various embodiments, the controller in the PZT loop, which is the microactuator compensator 71, is a linear baseline controller. In various other embodiments, the microactuator compensator 71 is configured to provide frequency shaped sliding mode control of the microactuator 33. In various embodiments, the controller in the VCM loop, which is the coarse actuator compensator 73, is configured to provide frequency shaped sliding mode control of the coarse actuator 32. In various embodiments, the coarse actuator compensator 73 in the VCM control loop is configured to provide filtering using a frequency-shaped filter, and to provide for nonlinear controlling of the coarse actuator 32 by using sliding mode control as illustrated by the sliding mode control unit 77.

When there exist vibrations, the vibrations cause the position of the head 30 to move away from a desired trajectory and introduce position error. In various embodiments, the shaping filter 74 monitors the adjusted position error signal and amplifies the adjusted position error signal at customized frequencies. Also, in various embodiments, another path provided by the derivative unit 75 monitors derivative information of the adjusted position error signal. In various embodiments, those two paths (i.e., the output of the shaping filter 74 and the output of the derivative unit 75) join together in the scaling unit 76 to provide a new design of the sliding surface, and generate the input of the nonlinear control as performed by the sliding mode control unit 77. In various embodiments, the nonlinear control provided by the sliding mode control unit 77 generates the coarse actuator control signal based on the above information that is input to the sliding mode control unit 77 to pull the head 30 to the desired trajectory. In various embodiments, the FSSMC provides for PES suppression due to accurate control of the head 30 at designer-selected peak frequencies, while also achieving a good transient response after large shock disturbances. Those benefits are realized in various embodiments for both single-stage actuator disk drives and for dual-stage actuator disk drives. In various embodiments, control parameter tunings in the disk drive 10 provide for more vibration attenuation in desired frequency ranges with reduced amplifications in other frequency ranges.

In various embodiments, frequency-shaped sliding mode control provides for better external vibration rejection in the disk drive 10 as compared with just sliding mode control, both in the frequency domain and the time domain. Compared with a linear control that is subject to the "waterbed" effect in which optimizing a track follow controller to reject disturbances at certain frequencies causes the track follow controller to amplify disturbances at other frequencies, algorithms in accordance with various embodiments disclosed herein that use nonlinear control have more vibration attenuation than amplification for the practical external vibrations considered. Various embodiments of algorithms disclosed herein, when implemented in disk drives, may reduce the 3-sigma value of position error and the peak to peak value, as well as improve the transient performance, as compared to existing linear controls. Therefore, with the algorithms in accordance with various embodiments, disk drives may become more robust to external disturbances such as audio vibrations and sudden shocks.

In various embodiments, frequency-shaped sliding mode control is provided for a single-stage actuator disk drive, which omits the microactuator compensator 71 and the microactuator position estimator 72 from the servo controller 42. In various embodiments FSSMC is derived directly in discrete-time form for implementation, for example, in a digital signal processor or other processing device. In various embodiments the time domain position error signal contains many (or infinite number) of frequency components, and a frequency spectrum of the position error signal represents a strength of each frequency component as a function of frequency. In some embodiments, frequency-shaping is performed by shaping the frequency spectrum by utilizing a filter. In various embodiments, the characteristic of the filter is represented by a frequency response curve that represents a varying amplification/attenuation factor as a function of frequency.

Various embodiments provide for FSSMC for dual-stage actuator disk drives, such as the disk drive 10. In some embodiments, a controller for a piezoelectric actuator loop is a linear controller, and a controller for a voice coil motor loop provides for frequency-shaped sliding mode control. In various embodiments, a frequency-shaped sliding mode control algorithm provides enhancements at frequencies where servo performance would otherwise be seriously degraded by large disturbances such as audio vibrations. Specifically, in various embodiments, the shaping filter 74 is introduced to shape sliding surface at preferred frequencies for sliding mode control. In various embodiments, the shaping filter 74 is a peak filter and a peak frequency of the peak filter is selected at a frequency where the PES is large.

Figure 3A:
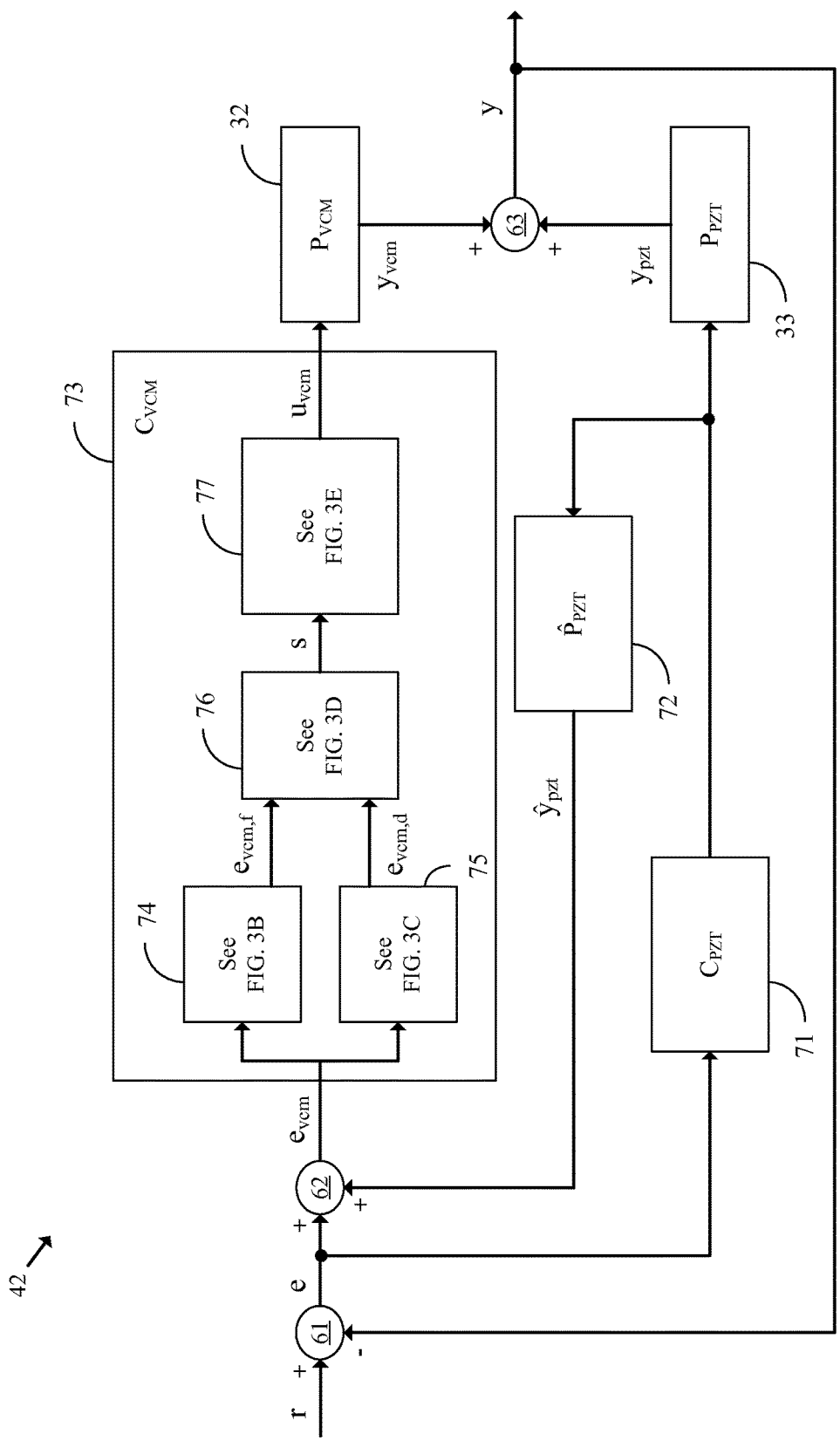
FIG. 3A illustrates a block diagram of a model of a dual stage actuator control design in accordance with an embodiment.

FIG. 3A illustrates a block diagram of a model of the dual stage actuator control design of FIG. 2 in accordance with an embodiment for the disk drive 10 of FIG. 1. With reference to FIGS. 1, 2, and 3A, in various embodiments the coarse actuator 32 has a transfer function $P_{VCM}$, the coarse actuator compensator 73 has a transfer function $C_{VCM}$, the microactuator 33 has a transfer function $P_{PZT}$, the microactuator compensator 71 has a transfer function $C_{PZT}$, and the microactuator position estimator 72 has a transfer function $\hat{P}_{PZT}$. The reference signal input to the first summing node 61 is denoted by "r" and the sensed position signal denoted by "y" is subtracted from the reference signal by the first summing node 61 to provide the position error signal denoted by "e". The estimated microactuator position signal denoted by "$\hat{y}_{pzt}$" is added to the position error signal by the second summing node 62, which provides the adjusted position error signal that is denoted by "$e_{vcm}$". The third summing node 63 illustrates that the position of the head 30 is a combination of the position of the head 30 due to the movement of the coarse actuator 32 (denoted by "$y_{vcm}$") and the position of the head 30 due to the movement of the microactuator 33 (denoted by "$y_{pzt}$"). The PES is specified by sample points obtained at various sampling times when the head 30 is reading servo information from the embedded servo sectors of the disk 20.

FIG. 3B illustrates a state space representation for the shaping filter 74 of FIGS. 2 and 3A in accordance with an embodiment. With reference to FIGS. 1, 2, 3A, and 3B, the $k^{th}$ sample point of the adjusted position error signal is denoted by "$e_{vcm}(k)$". The shaping filter 74 has a filter function in the frequency domain denoted by "$Q_f$". In various embodiments, the shaping filter 74 is implemented in the time domain using a state space representation of the filter, such as in FIG. 3B. In various embodiments, the state space representation of the shaping filter 74 is provided by the following equations:

$$e_w(k+1)=A_w e_w(k)+B_w e_{vcm} \quad (1)$$

$$e_{vcm,f}(k)=Q_f\{e_1(k)\}=C_w e_w(k)+D_w e_{vcm}(k) \quad (2)$$

where:

$$e_w(0) = \begin{bmatrix} 0 \\ 0 \end{bmatrix} \quad (3)$$

$A_w, B_w, C_w, D_w$, are matrices with compatible dimensions (for example, if the shaping filter 74 is a second-order peak filter, then $A_w$ is a 2 by 2 matrix, $B_w$ is a 2 by 1 vector, $C_w$ is a 1 by 2 vector, and $D_w$ is a 1 by 1 scaler.)

Using the above equations 1, 2, and 3 for the shaping filter 74, the shaping filter 74 generates a sample point of the filtered position error signal (denoted by "$e_{vcm,f}$") for each sample point of the adjusted position error signal $e_{vcm}$, such that $e_{vcm}(k)$ is the input and $e_{vcm,f}(k)$, which is equal to $Q_f\{e_{vcm}(k)\}$ is the output of the shaping filter 74. In various embodiments, the values $A_w$, $B_w$, $C_w$, and $D_w$ are set for a desired filter response. It can be noticed that, in various embodiments, $e_{vcm,f}(k)$ is obtained based on $e_{vcm}(k)$ and $e_w(k)$, where $e_w(k)$ is further based on $e_w(k-1)$ and $e_{vcm}(k-1)$. Therefore, in such embodiments, $e_{vcm,f}(k)$ is obtained from the time sequence of $\{e_{vcm}(i)\}$ (i=0, 1, . . . ,k).

In various embodiments, the shaping filter 74 provides for frequency shaping. In various embodiments, the shaping filter 74 is a peak filter and the peak filter operator $Q_f$ of the peak filter is configured such that:

$$|Q_f(w)|=|C_w(e^{jw}I_m-A_w)^{-1}B_w+D_w| \quad (4)$$

where:
j is the complex number,
e in this equation is the base of the natural logarithm,
$I_m$ is an m by m matrix (where m is the order of the shaping filter, such as 2 for second-order), and
|•| denotes the magnitude of a complex number.

The above equation 4 can be written, for example, with notation to indicate a size of each matrix, vector, or scalar in parenthesis after the name of the matrix, vector, or scalar as follows:

$$|Q_f(w)|=|C_w(1,m)(e^{jw}I_m(m,m)-A_w(m,m))^{-1}B_w(m,1)+D_w(1,1)| \quad (5)$$

Figure 4:
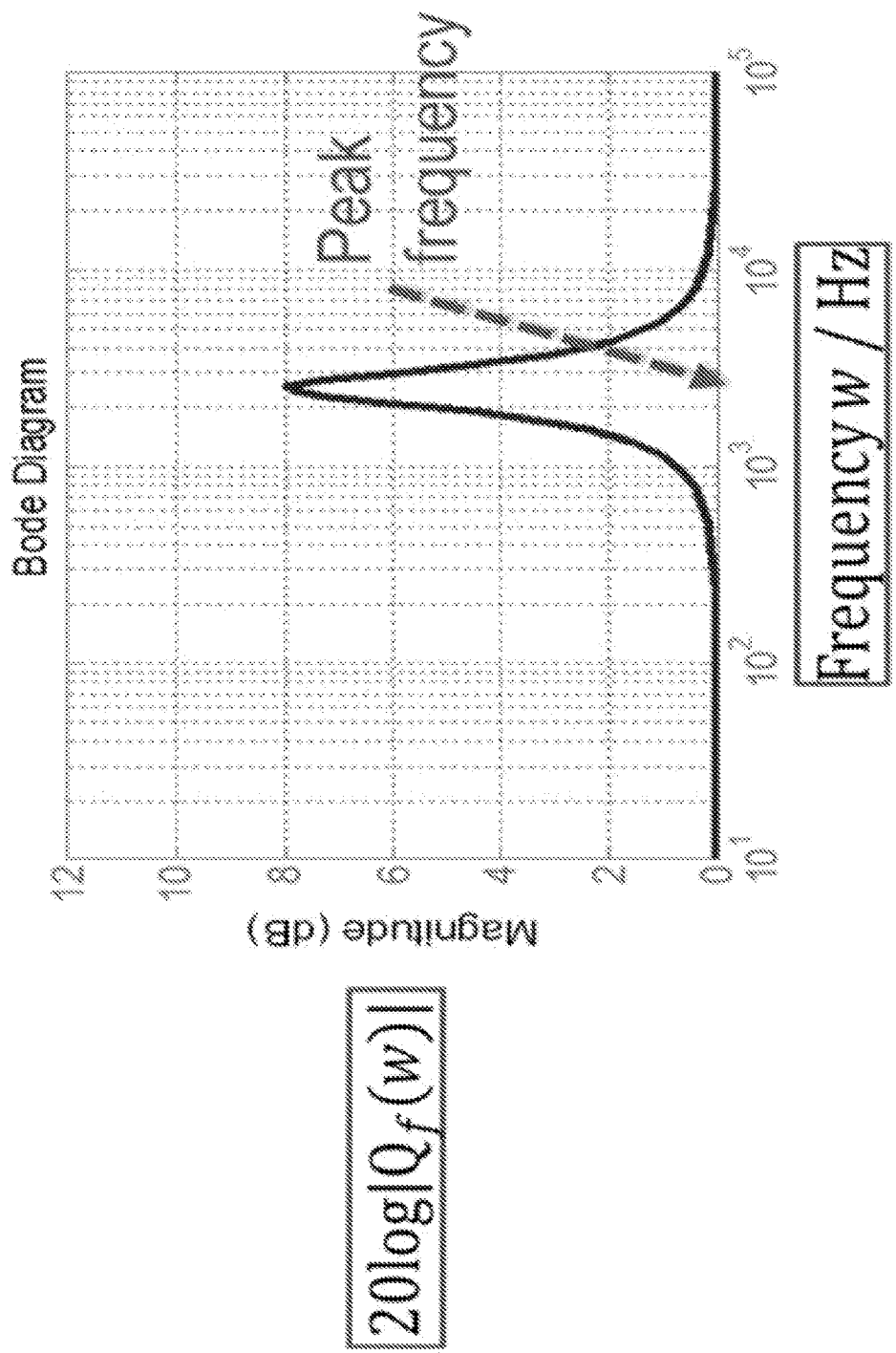
FIG. 4 illustrates a graph of an example of a peak filter operator in accordance with an embodiment.

$|Q_f(w)|$ has specific values as w varies, and a graph of an example of $|Q_f(w)|$ is shown in FIG. 4, with an example location of a peak frequency shown in that figure. With reference to FIGS. 3A and 3B, if $e_{vcm}$ is a sinusoidal signal with specific frequency $w_0$, then $e_{vcm,f}$ will also be a sinusoidal signal of the same frequency ($w_0$), but the magnitude is amplified by $|Q_f(w_0)|$, that is:

$$\frac{|e_{vcm,f}|}{|e_{vcm}|} = |Q_f(w_0)|. \quad (6)$$

If $e_{vcm}$ contains components at different frequencies ($w_1, w_2, \ldots, w_j$), then $e_{vcm,f}$ also contains components at such frequencies ($w_1, w_2, \ldots, w_j$), but the magnitude would be amplified by ($|Q_f(w_1)|, |Q_f(w_1)|, \ldots, |Q_f(w_j)|$), respectively. Therefore, $|Q_f(w)|$ can determine how much the input magnitude can be amplified at different frequencies by passing filter $Q_f$.

In various embodiments where the shaping filter 74 is a peak filter and the peak filter operator $Q_f$ for the shaping filter 74 is designed as in FIG. 4, it implies that the magnitude of $e_{vcm}$ will be amplified around the peak frequency and kept the same at other frequencies after passing this filter. By using such a specifically amplified signal $e_{vcm,f}$ instead of $e_{vcm}$ to design the sliding surface for the sliding mode control, the sliding mode control senses that the PES has more energy around the peak frequency of the peak filter, and would therefore put more control effort around the peak frequency, which is an advantage of the frequency shaping for the sliding mode control.

FIG. 3C illustrates an example equation for the derivative unit 75 of FIGS. 2 and 3A in accordance with an embodiment. With reference to FIGS. 1, 2, 3A, and 3C, in various embodiments the derivative unit 75 is configured to generate the derivative position error signal $e_{vcm,d}$ from the samples of the adjusted position error signal $e_{vcm}$ according to the following equation:

$$e_{vcm,d}(k) = \frac{e_{vcm}(k) - e_{vcm}(k-1)}{T} \quad (7)$$

In equation 7, T is the sampling time, which is the time between sample points of the position error signal. In various other embodiments, any suitable method for calculating a derivative can be used for the calculation in the derivative unit 75.

FIG. 3D illustrates an example equation for the scaling unit 76 of FIGS. 2 and 3A in accordance with an embodiment. In various embodiments, the scaling unit 76 is configured to generate the samples of the sliding mode signal "s" from the samples of the filtered position error signal $e_{vcm,f}$ and the samples of the derivative position error signal $e_{vcm,d}$ according to the following equation:

$$s(k) = H \begin{bmatrix} e_{vcm,f}(k) \\ e_{vcm,d}(k) \end{bmatrix} = e_{vcm,f}(k) + h_2 e_{vcm,d}(k) \quad (8)$$

where:

$$H=[1 \, h_2] \quad (9)$$

$h_2$ is a scalar value.

In various embodiments, a sliding surface for the sliding mode control is then defined as $s(k)=0$. The value of $h_2$ is selected to providing a desired scaling. In some embodiments, the derivative position error signal is scaled by the scaling unit 76 as shown in the above equation 8. In some embodiments, both the filtered position error signal and the derivative position error signal are scaled by the scaling unit 76.

FIG. 3E illustrates a control law for the sliding mode control unit 77 of FIGS. 2 and 3A in accordance with an embodiment. With reference to FIGS. 1, 2, 3A, and 3E, in various embodiments the sliding mode control unit 77 is configured such that the frequency-shaped sliding mode control provided by the sliding mode control unit 77 to generate samples of the coarse actuator control signal "$u_{vcm}$" from samples of the sliding mode signal "s" is specified by the following equations:

$$u_{vcm}(k)=(\tilde{H}\tilde{B})^{-1}[(1-qT)s(k)-\tilde{H}\tilde{A}\tilde{E}(k)-(\epsilon T+\beta)\text{sgn}(s(k))] \quad (10)$$

where:

$$\tilde{H}=[C_w, D_w, h_2] \quad (11)$$

$$\tilde{B} = \begin{bmatrix} 0 \\ B_1 \\ B_2 \end{bmatrix} \quad (12)$$

$$q>0 \quad (13)$$

$$1-qT>0 \quad (14)$$

$$\tilde{A} = \begin{bmatrix} A_w & B_w & 0 \\ 0 & A_{11} & A_{12} \\ 0 & A_{21} & A_{22} \end{bmatrix} \quad (15)$$

$$e(k) = \begin{bmatrix} e_{vcm,f}(k) \\ e_{vcm,d}(k) \end{bmatrix} \quad (16)$$

$$\tilde{E}(k)=(e_w^T(k), e^T(k))^T \quad (17)$$

$$0 \leq \epsilon < 1 \quad (18)$$

$$\beta=\tilde{H}\tilde{B}D+\tilde{H}\tilde{B}_\alpha V_\alpha \quad (19)$$

$A_{11}$, $A_{12}$, $A_{21}$, $A_{22}$, $B_1$, $B_2$, D, $V_\alpha$ are Scalar Values.

In equations 10 and 14, T is the sampling time interval between position error signal samples. In equation 17, T represents the matrix transpose operator. $\tilde{E}(k)$ is an augmented vector that includes both $e_w(k)$ and $e(k)$, which stands for both the internal state of the filter $Q_f$ and the filtered position error signal information and the derivative position error signal information. In various embodiments, to avoid chattering, a small boundary layer is introduced to reduce the chattering problem.

The above equations 11 and 15 can be written, for example, with notation to indicate a size of each matrix, vector, or scalar in parenthesis after the name of the matrix, vector, or scalar as follows:

$$\tilde{H}(1, m+1+1)=[C_w(1,m) D_w(1,1) h_2(1,1)] \quad (20)$$

$$\tilde{A}(m+2, m+2) = \begin{bmatrix} A_w(m,m) & B_w(m,1) & 0(m,1) \\ 0(1,m) & A_{11}(1,1) & A_{12}(1,1) \\ 0(1,m) & A_{21}(1,1) & A_{22}(1,1) \end{bmatrix} \quad (21)$$

In the above equations 20 and 21, therefore, $\tilde{H}$ is a 1 by (m+1+1) vector, and $\tilde{A}$ is an (m+2) by (m+2) matrix, where m is the order of the shaping filter 74, which may be, for example, 2 for a second-order filter.

In various embodiments, $\tilde{A}$ and $\tilde{B}$ are augmented matrices with values that are selected to take into account both the plant of the coarse actuator 32 and the filter $Q_f$. In various embodiments, s(k) is the sliding surface variable, which is a combination of both the filtered position error and the derivative position error. In various embodiments, the goal of the frequency shaped sliding mode control is to make s(k) as small as possible, since s(k) being small means that both the position error and its derivative are small. In various embodiments, if s(k) is large, which means that at least one of the two (i.e., the filtered position error and the derivative position error) is large, then $u_{vcm}(k)$ is supposed to be large to drive the head 30 back to the desired trajectory (and thus s(k) will be reduced). In equation 10, sgn(s(k)) is a nonlinear (switching) function of s. If s(k) is positive, then sgn(s(k)) is 1, and if s(k) is negative then sgn(s(k)) is −1, which is a robust term of the sliding mode control that makes additional effort to further reduce s(k), so that both the position error and the derivative of the position error will be reduced. Parameters $\epsilon$ and $\beta$ are parameters to be set to specify how much of such additional effort will be added.

In various embodiments, the control system for the disk drive 10 includes the VCM and PZT control loops. In some embodiments, the PZT control loop implements a linear baseline control, but in various other embodiments is can also be designed as FSSMC, which is similar to that of the VCM control loop as described herein. In various embodiments, the VCM control loop implements filtering and nonlinear controlling. When there exist vibrations, the position of the head 30 moves away from the desired trajectory and introduces position error. In various embodiments, a filtering path including the shaping filter 74 monitors the position error signal of the VCM control loop and amplifies the position error at customized frequencies. Also, in various embodiments, another path including the derivative unit 75 monitors the derivative information of the VCM control loop position error. In some embodiments, those two paths join together to provide a new design of the sliding surface and to generate the input of the nonlinear control. The nonlinear control, such as provided by the sliding mode control unit 77 in various embodiments, can generate a desired coarse actuator control signal to cause the coarse actuator 32 to pull the head 30 back to the desired trajectory.

In various embodiments, the frequency-shaped sliding mode control provides for vibration rejection at a peak frequency, without too much amplification at other frequencies. In some embodiments, in time domain the peak-to-peak value of the PES can be reduced by frequency-shaped sliding mode control. Also, in some embodiments, the frequency-shaped sliding mode control allows for the PES around the peak frequency to be reduced, with not too much amplification at other frequencies. In various embodiments, the frequency-shaped sliding mode control has a fast convergence for a transient response after a sudden large shock.

In various embodiments, the sliding mode control needs to satisfy two conditions to ensure stability: (i) an approaching condition in which the trajectory s(k), starting from any initial point, reaches to the sliding surface s(k)=0 in finite time; and (ii) a sliding condition in which after the trajectory reaches the sliding surface, it stays on it. This means that the sliding surface s(k)=0 in various embodiments should define stable dynamics for $\tilde{E}(k)$, which ensures the boundedness of the tracking error $e_{vcm,f}(k)$ and $e_{vcm,d}(k)$ when s(k) is bounded. Therefore, the overall stability analysis includes both the approaching phase and the sliding phase of the sliding mode control.

In various embodiments, the sliding mode control unit 77 is configured such that in an approaching phase of the sliding mode control the sliding surface (switching plane) s(k)=0 will be reached in finite time. In various embodiments, the sliding mode control satisfies stability conditions for discrete-time approaching dynamics, which are: (i) starting from any initial point, the trajectory will move monotonically toward the switching plane and cross it in finite time; (ii) once the trajectory has crossed the switching plane for the first time, it will cross the plane again in every successive sampling period, resulting in a zigzag motion about the switching plane; and (iii) the trajectory stays in a band. In some implementations, the discontinuous function sgn is replaced by a saturation function sat(s(k)/φ) to inhibit the chatter phenomenon. In various embodiments, the sliding mode control unit 77 is configured such that the sliding phase of the sliding mode control satisfies conditions that guarantee the stability of the overall control.

In some embodiments, the shaping filter 74 is a peak filter with a single peak (PFSP). In some embodiments, the shaping filter 74 is a peak filter with multi-peaks (PFMP). In cases where there are more than one peak in audio vibrations, such cases may be advantageously handled in various embodiments by FSSMC with a PFMP. In some instances in which it is not known in advance at which frequencies the servo performance is most degraded, such frequency ranges are identified in various embodiments in real time through processing the position error signal e(k) by an adaptive notch filter with an adjustable notch frequencies. The determined frequency ranges are then used in various embodiments where the shaping filter 74 is a peak filter to set one or more peak frequencies of the peak filter.

Figure 5:
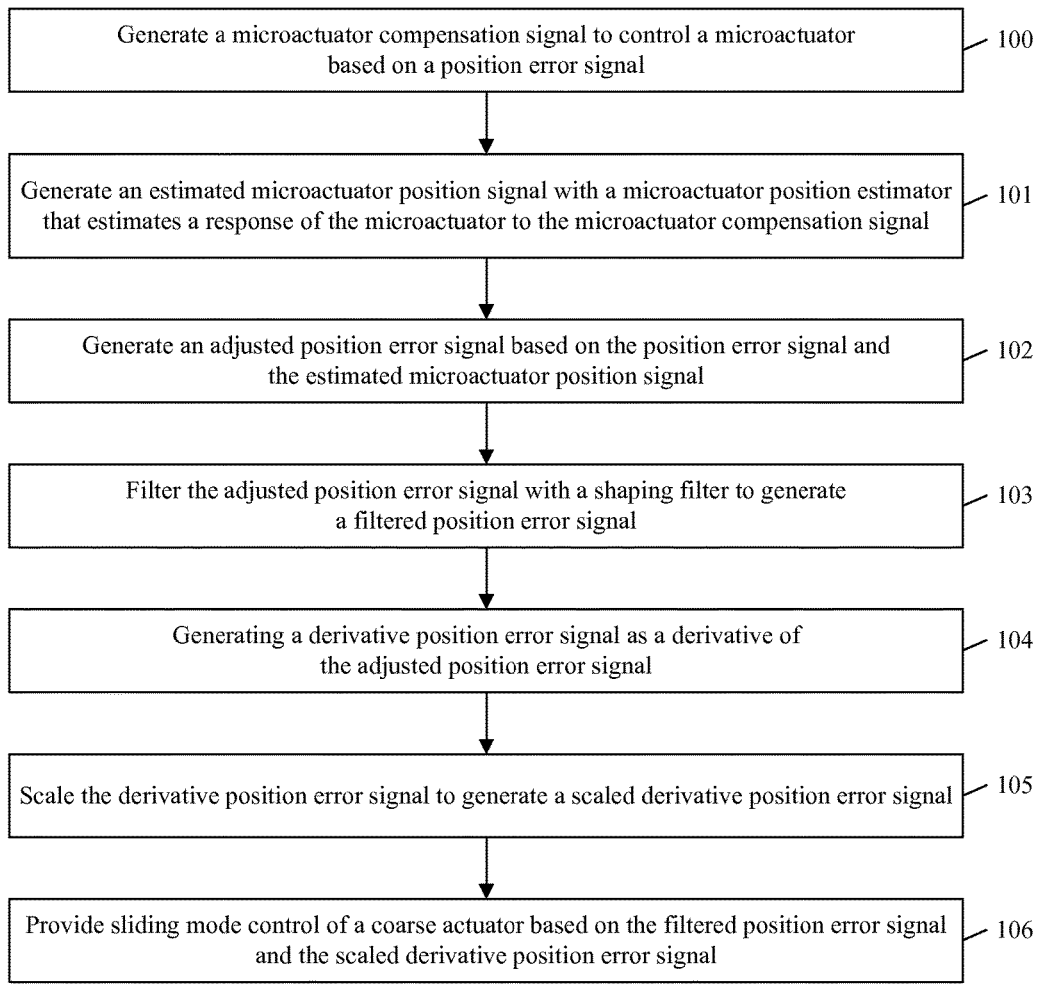
FIG. 5 illustrates a flowchart of a method in a data storage device in accordance with an embodiment for providing frequency-shaped sliding mode control.

FIG. 5 illustrates a flowchart of a method for providing control in a data storage device in accordance with an embodiment. In some embodiments, the disk drive 10 of FIG. 1 with the servo controller 42 in FIG. 2 is configured to perform the method of FIG. 5. In block 100, a microactuator compensation signal is generated to control a microactuator based on a position error signal, and the method continues to block 101. In block 101, an estimated microactuator position signal is generated by a microactuator position estimator that estimates a response of the microactuator to the microactuator compensation signal, and the method continues to block 102. In block 102, an adjusted position error signal is generated based on the position error signal and the estimated microactuator position signal, and the method continues to block 103.

In block 103, the adjusted position error signal is filtered with a shaping filter to generate a filtered position error signal, and the method continues to block 104. In block 104, a derivative position error signal is generated as a derivative of the adjusted position error signal, and the method continues to block 105. In block 105, the derivative position error signal is scaled to generate a scaled derivative position error signal, and the method continues to block 106. In block 106, sliding mode control of a coarse actuator is provided based on the filtered position error signal and the scaled derivative position error signal. Thus, in various embodiments, the sliding mode control of the coarse actuator is based at least partially on the filtered position error signal. Also, in various embodiments, the sliding mode control is based on the filtered position error signal and the derivative position error signal.

In various embodiments, the shaping filter is a peak filter with a single peak. In some embodiments, the shaping filter is a peak filter with multiple peaks. In various embodiments, the sliding mode control is a discrete time nonlinear control that includes an approaching phase in which a trajectory of the sliding mode control is toward a sliding surface and a sliding phase in which the trajectory of the sliding mode control is to slide along the sliding surface, where the sliding mode control has a different gain when the trajectory is approaching from one side of the sliding surface than when the trajectory is approaching from an opposite side of the sliding surface.

Figure 6:
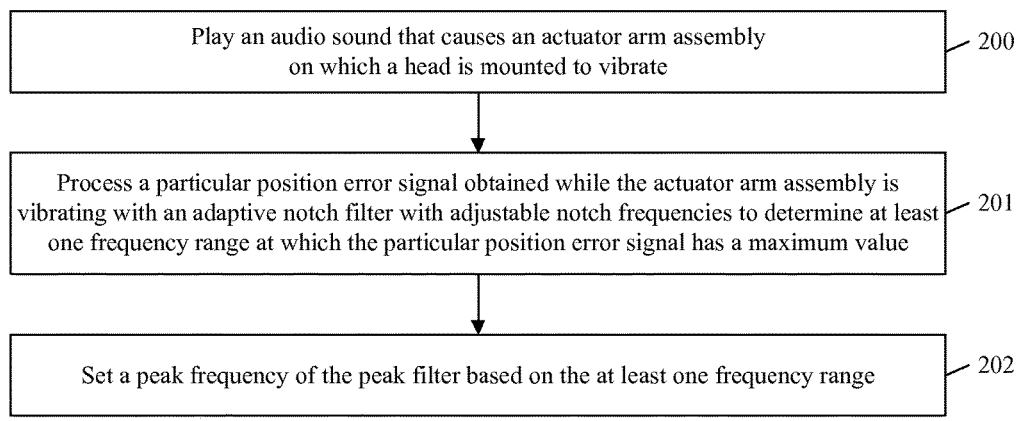
FIG. 6 illustrates a flowchart of a method in a data storage device in accordance with an embodiment for setting one or more peak frequencies of a peak filter to be used for frequency-shaped sliding mode control.

FIG. 6 illustrates a method in accordance with an embodiment for setting one or more peak frequencies of a peak filter that is used as a shaping filter for frequency-shaped sliding mode control. In various embodiments, the method of FIG. 6 can be performed to set up a disk drive, such as the disk drive 10 of FIG. 1, for performing the method of FIG. 5. In some embodiments, the disk drive 10 of FIG. 1 with the servo controller 42 in FIG. 2 includes an adjustable notch filter with adjustable notch frequencies and is configured to perform the method of FIG. 6. In block 200, an audio sound is played that causes an actuator arm assembly on which a head is mounted to vibrate, and the method continues to block 201. In block 201, a particular position error signal obtained while the actuator arm assembly is vibrating is processed with the adaptive notch filter with adjustable notch frequencies to determine at least one frequency range at which the particular position error signal has a maximum value, and the method continues to block 202. In block 202, a peak frequency of the peak filter is set based on the at least one frequency range.

The embodiments disclosed herein are to be considered in all respects as illustrative, and not restrictive of the invention. The present invention is in no way limited to the embodiments described above. For example, in the various methods illustrated, the actions and/or functions may be performed in a different order and certain actions and/or functions may be omitted, combined and/or separated into further actions and/or functions. Various modifications and changes may be made to the embodiments without departing from the spirit and scope of the invention. Various modifications and changes that come within the meaning and range of equivalency of the claims are intended to be within the scope of the invention.

What is claimed is:

1. A data storage device, comprising:
   a microactuator configured to position a head relative to a disk;
   a coarse actuator configured to position the microactuator relative to the disk; and
   a servo controller configured to generate an adjusted position error signal based on a position error signal and an estimated microactuator position signal, and configured to filter the adjusted position error signal with a shaping filter to generate a filtered position error signal, and configured to provide sliding mode control of the coarse actuator based at least partially on the filtered position error signal;
   wherein the shaping filter is configured to provide frequency dependent filtering of the adjusted position error signal to generate the filtered position error signal.

2. The data storage device of claim 1,
   wherein the servo controller is further configured to generate a derivative position error signal as a derivative of the adjusted position error signal, and is configured to provide the sliding mode control of the coarse actuator based on the filtered position error signal and the derivative position error signal.

3. The data storage device of claim 2,
   wherein the servo controller is further configured to scale the derivative position error signal to generate a scaled derivative position error signal, and is configured to provide the sliding mode control of the coarse actuator based on the filtered position error signal and the scaled derivative position error signal.

4. The data storage device of claim 1,
   wherein the servo controller comprises a digital signal processor programmed with a discrete time state space model of the shaping filter and a control law for the sliding mode control.

5. The data storage device of claim 1,
   wherein the shaping filter is a peak filter with a single peak.

6. The data storage device of claim 1,
   wherein the shaping filter is a peak filter with multiple peaks.

7. The data storage device of claim 1,
   wherein the shaping filter is a peak filter that is configured to amplify a magnitude of the adjusted position error signal when a frequency of the adjusted position error signal is approximately a peak frequency of the peak filter.

8. The data storage device of claim 7,
   wherein the peak frequency of the peak filter is an expected frequency of the position error signal due to vibration of an actuator arm assembly on which the head is mounted induced by audio sounds.

9. The data storage device of claim 1,
   wherein the servo controller is further configured such that the sliding mode control provided by the servo controller comprises a nonlinear control of the coarse actuator with respect to the filtered position error signal.

10. The data storage device of claim 1,
    wherein the servo controller is further configured such that the sliding mode control comprises a discrete time nonlinear control that includes an approaching phase in which a trajectory of the sliding mode control is toward a sliding surface and a sliding phase in which the trajectory of the sliding mode control is to slide along the sliding surface, and wherein the sliding mode control has a different gain when the trajectory is approaching from one side of the sliding surface than when the trajectory is approaching from an opposite side of the sliding surface.

11. The data storage device of claim 1,
    wherein the coarse actuator comprises a voice coil motor; and
    wherein the microactuator comprises a piezoelectric actuator.

12. The data storage device of claim 1,
    wherein the position error signal represents a position of the head relative to a center of a track of the disk; and
    wherein the servo controller is further configured to generate a microactuator compensation signal to control the microactuator based on the position error signal, and is further configured to generate the estimated microactuator position signal with a microactuator position estimator that estimates a response of the microactuator to the microactuator compensation signal.

13. A method for providing control in a data storage device, the method comprising:
    generating an adjusted position error signal based on a position error signal and an estimated microactuator position signal;
    filtering the adjusted position error signal with a shaping filter that provides frequency dependent filtering of the adjusted position error signal to generate a filtered position error signal; and
    providing sliding mode control of a coarse actuator based at least partially on the filtered position error signal.

14. The method of claim 13, further comprising:
generating a microactuator compensation signal to control a microactuator based on the position error signal; and
generating the estimated microactuator position signal with a microactuator position estimator that estimates a response of the microactuator to the microactuator compensation signal;
wherein the position error signal represents a position of a head moved by the coarse actuator and the microactuator relative to a center of a track of a disk.

15. The method of claim 13, further comprising:
generating a derivative position error signal as a derivative of the adjusted position error signal;
wherein providing the sliding mode control includes providing the sliding mode control based on the filtered position error signal and the derivative position error signal.

16. The method of claim 15, further comprising:
scaling the derivative position error signal to generate a scaled derivative position error signal;
wherein providing the sliding mode control includes providing the sliding mode control based on the filtered position error signal and the scaled derivative position error signal.

17. The method of claim 13,
wherein the shaping filter is a peak filter with a single peak.

18. The method of claim 13,
wherein the shaping filter is a peak filter with multiple peaks.

19. The method of claim 13, wherein the shaping filter is a peak filter, and wherein the method further comprises:
processing a particular position error signal obtained while an actuator arm assembly on which a head is mounted to is vibrating due to external audio sound with an adaptive notch filter with adjustable notch frequencies to determine at least one frequency range at which the particular position error signal has a maximum value; and
setting a peak frequency of the peak filter based on the at least one frequency range.

20. The method of claim 13,
wherein the sliding mode control comprises a discrete time nonlinear control that includes an approaching phase in which a trajectory of the sliding mode control is toward a sliding surface and a sliding phase in which the trajectory of the sliding mode control is to slide along the sliding surface, and wherein the sliding mode control has a different gain when the trajectory is approaching from one side of the sliding surface than when the trajectory is approaching from an opposite side of the sliding surface.

21. The method of claim 13,
wherein the shaping filter has a frequency response that provides a varying amplification or attenuation of the adjusted position error signal as a function of frequency of the adjusted position error signal.

22. The method of claim 13,
wherein the shaping filter is a peak filter having a frequency response that is at a maximum at a peak frequency.

23. The method of claim 22,
wherein the peak filter provides for amplifying a magnitude of the adjusted position error signal for a frequency range around the peak frequency, and provides for keeping the magnitude of the adjusted position error signal unchanged for other frequencies.

24. The method of claim 13,
wherein the shaping filter provides for different amplifications of the adjusted position error signal for different frequencies of the adjusted position error signal.

25. The method of claim 13,
wherein the shaping filter provides frequency dependent amplification of the adjusted position error signal to generate the filtered position error signal.

* * * * *